July 14, 1942.   I. H. DALE ET AL   2,290,096
CONTROL MEANS FOR AIR CONDITIONING SYSTEMS
Filed Dec. 4, 1939   2 Sheets-Sheet 1
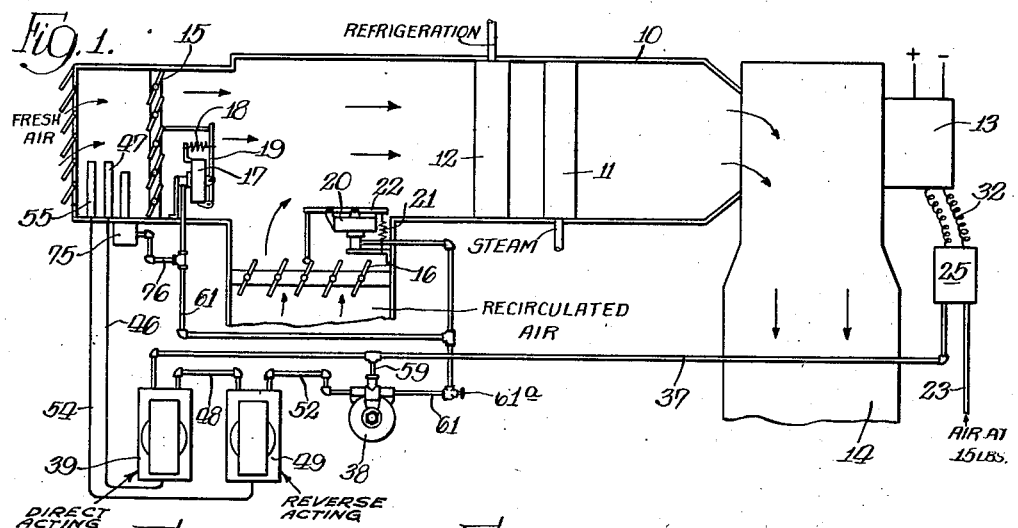
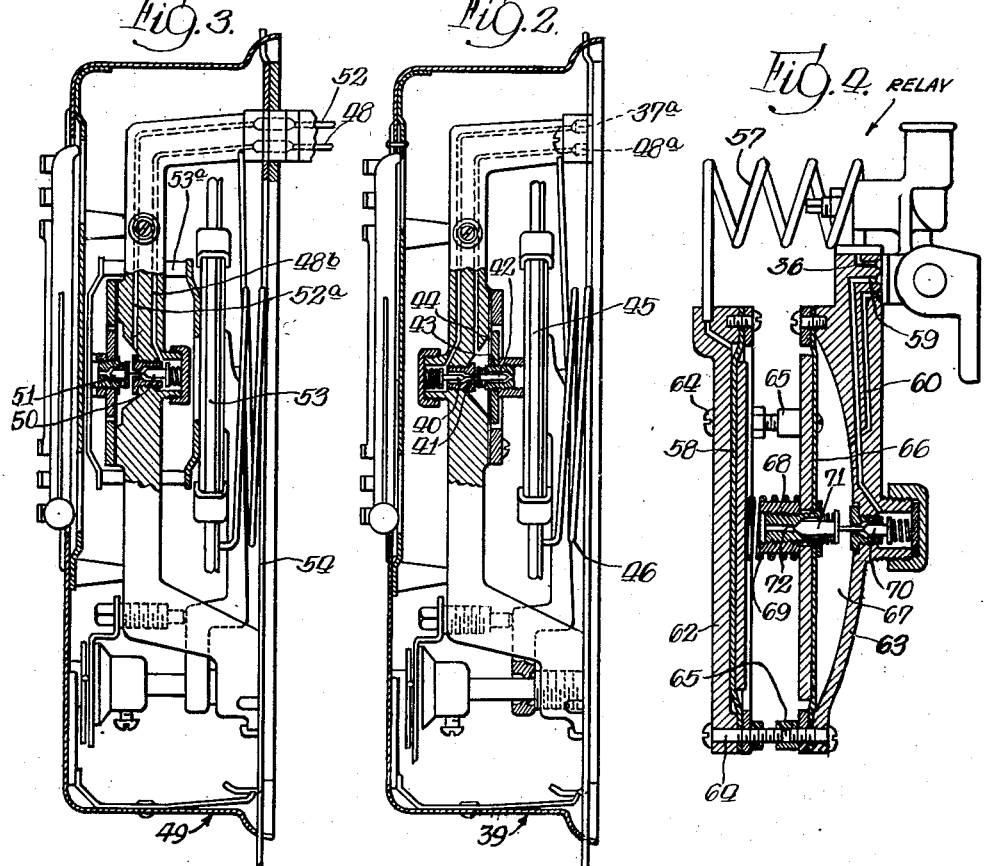
INVENTOR.
Irving Hamilton Dale.
Alvin L. Crump.
BY
ATTORNEY.

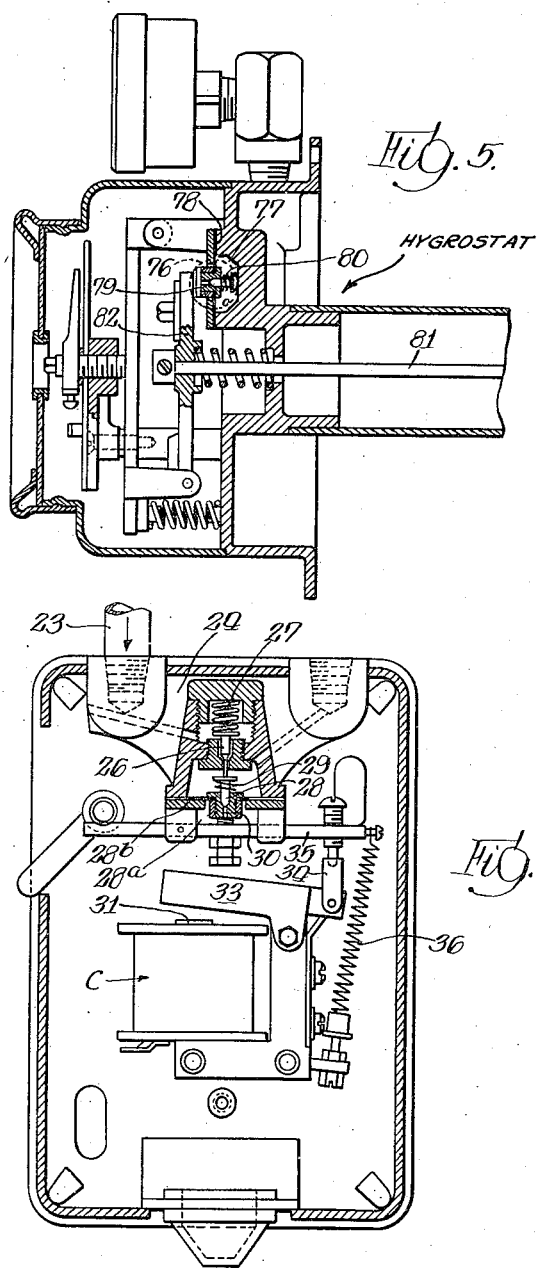

Patented July 14, 1942

2,290,096

UNITED STATES PATENT OFFICE 2,290,096

CONTROL MEANS FOR AIR CONDITIONING SYSTEMS

Irving Hamilton Dale, Melrose, Mass., and Alvin L. Crump, Evanston, Ill., assignors to The Powers Regulator Company, Chicago, Ill., a corporation of Illinois Application December 4, 1939, Serial No. 307,424

1 Claim. (Cl. 236—49)

Our invention has for its object the provision of means that will act automatically to close a fresh air inlet during extreme temperatures, either cold or hot, thus conserving in the cost of conditioning the air at such extreme temperatures. In connection with the apparatus used for the described purpose, we provide heat exchange elements for both heating and cooling, utilizing the same circulating fan or blower.

Since in many cases it is a requirement that some fresh air shall be admitted at all times during occupancy, regardless of temperature conditions, we utilize mechanism that will maintain the damper for the inlet opening in a minimum open position, even in extreme temperatures. However, other mechanism in the system, operative only when the circulation of air is interrupted, acts to bring about complete closing of the inlet opening.

It is desired also in air conditioning for living comfort and economy that the degree of opening of the fresh air inlet is related to the humidity or moisture content of the air. Particularly in hot weather it will be found to greatly reduce the load on the conditioning apparatus if, when the outside air is highly humid, the size of the inlet opening may be greatly reduced. To this end we provide a hygrostat, subject to the outdoor humidity and acting to bring about the closing of the inlet damper under some conditions.

The invention will be more readily understood by reference to the accompanying drawings; in which, Fig. 1 is a diagrammatic view of a system such as contemplated herein;

Fig. 2 is a sectional view through a direct acting thermostat, the use of which in the system is contemplated;

Fig. 3 is a similar view through a reverse acting thermostat;

Fig. 4 is a sectional view through a direct acting gradual minimum pressure relay, the use of which is desirable;

Fig. 5 is a sectional view through a hygrostat, the use of which is optional; and, Fig. 6 is a view through an electro-pneumatic valve.

In Fig. 1 we have shown diagrammatically a casing 10 adapted to contain heating coils 11 and cooling coils 12. A fan operated by a motor 13 causes the delivery of air that enters the casing to a desired space through the duct 14. An inlet opening for fresh air is controlled by a louvre damper 15 and a recirculated air opening is controlled by a louvre damper 16. The damper 15 is operated by an air motor 17 so arranged that with no pressure in the system the spring 18 pulls the motor arm 19 downward and closes the blades of the damper 15. Thus this damper is termed a normally closed damper. The damper for the recirculated air opening is controlled by a motor 20 oppositely arranged to the one indicated at 17, the spring 21 tending to pull downward on the motor arm 22 and to move the damper blades toward open position. This is termed a normally open damper. In the position shown in Fig. 1 a certain fixed medium pressure is maintained on the respective motors, thus preventing entire closing of the damper 15.

The operating means for the respective damper motors is as follows:

A supply of air at fifteen pounds pressure is received through the pipe 23, being delivered into the valve body 24 of an electro-pneumatic switch, indicated generally by the numeral 25 and best shown in Fig. 6. The valve assembly includes a valve 26 seated by a spring 27 which prevents the passage of air from the pipe 23. A second valve 28 having a stem that extends upwardly into contact with the valve 26 tends to be unseated by the spring 29, the valve controlling an exhaust opening 30. The valve body 28a is carried by a diaphragm 28b permitting the entire assembly to be moved bodily upward to close the exhaust opening and to open the valve 26.

A magnetic element 31 wired in series with the fan motor 13 through the wires 32 controls a pivoted armature 33 connected by a link 34 to a lever 35 held in lowered position by a tension spring 36. The lever 35 underlies the exhaust valve and when current for operating the fan motor energizes the magnet 31 the valve box 28a will be moved upward, closing the exhaust opening 30 and opening the valve 26. This permits air to pass under full pressure from pipe 23 to pipe 37. Of course, on the interruption of the supply of current to the fan motor, the reverse action takes place, the valve 26 is closed and the exhaust port 30 opened, thus permitting the escape of air in the system.

As a further insurance against trapping of air in the line 61, we provide a bleed valve 61a in the line, as shown in Fig. 1.

The pipe 37 is connected to a relay indicated generally by the numeral 38 and shown in cross-section in Fig. 4 and to the direct acting thermostat 39, a cross-section of which is shown in Fig. 2 and which will first be described.

The air from the pipe 37 enters the instrument through the passage 37a, being held by a valve 40, a projection 41 from which extends through the valve opening into contact with a second valve 42 engaging in a valve body 43 supported on a diaphragm 44. The valve body abuts against an expansible element 45 in communication through a tube 46 with a bulb 47 located in the fresh air intake. The chamber between the two valves is open to a passage 48a to which a pipe 48 is connected. The pipe 48 which is known as the return from thermostat 39 acts as the supply pipe for the reverse acting thermostat 49, a cross-section of which is shown in Fig. 3.

Air entering through the pipe 48 is delivered to the thermostat 49 through the passage 48b to a valve 50, a second valve 51 and an outlet passage 52a, known as the return from this thermostat, the parts being a duplicate of those already described. The expansible member 53 in this case transmits its force through connecting members 53a to the opposite side of the instrument from that shown in Fig. 2, as the result of which the operation is the reverse of that already described. In other words, in the direct acting thermostat of Fig. 2, an increased amount of air is passed on a rise in temperature over that for which the instrument is set, while in the reverse acting thermostat a lessened pressure of air is passed on an increase in temperature over the setting of the instrument.

The expansible member 53 is connected through a flexible tube 54 to a bulb 55 located in the fresh air inlet. Preferably the direct acting thermostat will be set for 35° and the reverse acting thermostat for 80°. Also the direct acting thermostat will be of the type that will pass one-half pound of air for every degree of temperature change, while the reverse acting instrument will pass two pounds of air for each one degree change.

The air delivered through the return passage 52a is transmitted through a pipe 52 to an inlet passage 56 in the relay shown in section in Fig. 4, it being delivered through a coiled tube 57 to the space at one side of a diaphragm 58. Air under the supply pressure of fifteen pounds delivered from the pipe 37 is admitted into the instrument through the pipe 59. The air delivered as permitted by the relay instrument escapes through the passage 60 to the pipe 61 thence to the direct and reverse acting damper motors 17—20 in accordance with the requirements of the relay setting and the demands of the two thermostats.

The operation of the relay is as follows:

The diaphragm 58 is carried in a face portion 62 that is joined to the main body portion 63 by screws 64, the ends of which engage in sleeves 65 fixed to the main body. Thus by turning the screws 64, the spacing of the face portion relative to the main body may be changed.

A second diaphragm 66 is carried by the main body and defines one side of a space 67 that is opened to the outlet passage 60. A sleeve 68 is located between the face plates that overlie the two diaphragms 58—66 and a spring 69 overlies the sleeve 68 and tends to spread apart the two diaphragms.

A valve 70 controls the inlet of air from the passage 59, the valve having an extension which engages with a second valve 71 which controls an exhaust passage 72. It will be seen that as there is bodily movement of the two diaphragms to the right, as viewed in Fig. 4, the exhaust passage will first be closed and then the inlet valve 70 will be opened. In the absence of the spring 69, it will be seen that the instrument will deliver air through the passage 60 and pipe 61 at the pressure that is effective against the diaphragm 58. However, in this case, it is desired that a minimum pressure of four pounds be delivered at all times by the relay when there is pressure in the supply line 37, in order that the fresh air inlet damper may not be entirely closed. Thus, we provide the spring 69 which serves to load the diaphragm 58 to an extent corresponding to four pounds of air pressure.

A schedule showing the pressures in the different lines at different temperatures assumes a setting of the direct acting thermostat at 35° and the reverse acting thermostat at 80°. It assumes also that four pounds of pressure is necessary in the damper motors for maintaining them in minimum position, and a pressure of seven pounds for actuating them to their full extent.

| Temperature at bulbs | Pressure at 48 | Pressure at 52 | Pressure at 61 |
| --- | --- | --- | --- |
| Degrees | Pounds | Pounds | Pounds |
| 20 | 0 | 0 | 4 |
| 25 | 2 | 2 | 4 |
| 30 | 4½ | 4½ | 4½ |
| 35 | 7 | 7 | 7 |
| 40 | 9½ | 9½ | 9½ |
| 45 | 12 | 12 | 12 |
| 50 | 14½ | 14½ | 14½ |
| 51 | 15 | 15 | 15 |
| To— | | | |
| 76 | 15 | 15 | 15 |
| 77 | 15 | 13 | 13 |
| 78 | 15 | 11 | 11 |
| 79 | 15 | 9 | 9 |
| 80 | 15 | 7 | 7 |
| 81 | 15 | 5 | 5 |
| 82 | 15 | 3 | 4 |
| 83 | 15 | 2 | 4 |
| 84 | 15 | 1 | 4 |
| 85 | 15 | 0 | 4 |

From the foregoing schedule it will be seen that with the temperature as low as 20° pressure effective on the damper motors will be four pounds; that with the temperature at 35° there will be a pressure of seven pounds, which means that the fresh air damper will be fully open and the recirculating damper fully closed. This will continue without change until a temperature of 77° is reached when the pressure will be gradually reduced until it reaches four pounds at 82° and thereabove, which provides for the minimum opening.

It is assumed, of course, that if at any time the system is shut off by stopping the fan motor, the fresh air damper will be fully closed, due to the fact that the supply of air will be interrupted by valve 25 and the air contained in the system beyond the valve 25 will be vented.

It is desirable in many cases to provide for the introduction of a reduced supply of fresh air when the air is relatively humid and in order that this may be accomplished automatically we provide a hygrostat indicated generally by the numeral 75 in Fig. 1. A pipe 76 connects with the pipe 61 and the construction of the hygrostat is illustrated in detail in Fig. 5.

In that figure the inlet from the pipe 76 is indicated in dotted lines, the inlet being open to a chamber 77, one wall of which is closed by a diaphragm 78. This diaphragm carries a valve body 79 having an exhaust passage and a valve 80 unseated by a spring tends to close said exhaust passage. A rod 81 connected to a moisture sensitive element is joined to an arm 82 which overlies the valve body 79. It will be seen that as the hygrostatic element contracts, the arm will move the valve bodly inwardly, thus closing the exhaust passage, while on a reverse movement the exhaust passage will be opened, permitting any pressure in the line 61 to be vented, thus closing the inlet damper and opening the recirculation damper. Thus on a particularly humid day the amount of fresh air taken in may be reduced even though the temperature would otherwise indicate a substantial opening of the fresh air damper. This will substantially reduce the operating cost of the system, since the expensive part of air conditioning is in reducing the amount of moisture in the air.

Of course, the temperature settings of the instruments may be varied within wide limits; also that the minimum pressure provided by the relay may be changed, through the indicated adjustment, to provide for a lesser or greater minimum opening of the fresh air damper. It will be understood also that the use of the hygrostat is optional, and that other means than that shown may be employed for entirely closing the fresh air inlet when the circulating fan is stopped. Further, in some installations it may be unnecessary to provide against complete closing of the fresh air damper during operation of the system. All these variations are contemplated by us.

We claim:

In an air-conditioning system, means providing inlets for fresh and recirculated air, a normally closed damper for the fresh air inlet and a normally open damper for the recirculated air inlet, air motors for operating said dampers and an air pipe leading thereto, damper control means including a direct-acting and a reverse acting thermostat in series in said air pipe, both subject to the temperature of incoming fresh air, said direct acting thermostat being set for a temperature below which the fresh air damper is moved to a predetermined partially closed position, and said reverse acting thermostat being set for a temperature above which said fresh air damper is moved to the same position, and a hygrostat in the fresh air inlet operating to permit said fresh air damper to move toward a closed position, regardless of the temperature, when the humidity condition of the air exceeds that for which the hygrostat is set.

IRVING HAMILTON DALE.
ALVIN L. CRUMP.